United States Patent
Belknap et al.

(10) Patent No.: US 7,720,352 B2
(45) Date of Patent: *May 18, 2010

(54) SYSTEMS AND COMPUTER PROGRAM PRODUCTS TO FACILITATE EFFICIENT TRANSMISSION AND PLAYBACK OF DIGITAL INFORMATION

(75) Inventors: William R. Belknap, San Jose, CA (US); Jane K. Doong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/014,545

(22) Filed: Jan. 15, 2008

(65) Prior Publication Data

US 2008/0175324 A1    Jul. 24, 2008

Related U.S. Application Data

(63) Continuation of application No. 09/895,055, filed on Jun. 29, 2001, now Pat. No. 7,356,245.

(51) Int. Cl.
*H04N 5/91* (2006.01)
(52) U.S. Cl. .............................. 386/72; 386/96; 386/125
(58) Field of Classification Search .................. 386/46, 386/52, 55, 65, 68, 95, 96, 98, 125
See application file for complete search history.

(56) References Cited

U.S. PATENT DOCUMENTS

| | | | |
|---|---|---|---|
| 5,477,397 A | 12/1995 | Naimpally et al. | |
| 5,479,303 A | 12/1995 | Suzuki et al. | |
| 5,734,784 A | 3/1998 | Tsinberg et al. | |
| 5,740,307 A | 4/1998 | Lane | |
| 5,742,347 A | 4/1998 | Kandlur et al. | |
| 5,768,536 A | 6/1998 | Strongin et al. | |
| 5,774,186 A | 6/1998 | Brodsky et al. | |
| 5,778,143 A | 7/1998 | Boyce | |

(Continued)

FOREIGN PATENT DOCUMENTS

EP    0 702 493 A1    3/1996

(Continued)

OTHER PUBLICATIONS http://www.erg.abdn.ac.uk/public_html/research/future-net/digital-video/mpeg2-dec.html; MPEG-2 Encoders and Decoders.

(Continued)

*Primary Examiner*—Huy T Nguyen
(74) *Attorney, Agent, or Firm*—Sughrue Mion, PLLC

(57) ABSTRACT

Systems, methods, and computer products that facilitate transmission of information used for fast and responsive video and audio playback at non-standard, trick mode speeds. An embodiment of the present invention uses low resolution, compressed, and independent frames derived from the encoded digital video or audio information to facilitate the operation of user-requested VTR-like speed change functions associated with digital video and digital audio frames. The present invention greatly simplifies locating specific frames in a video or audio presentation for purposes such as fast forward and fast reverse scanning that is typically used in digital editing.

12 Claims, 5 Drawing Sheets

U.S. PATENT DOCUMENTS

| | | | |
|---|---|---|---|
| 5,790,177 | A | 8/1998 | Kassatly |
| 5,841,939 | A | 11/1998 | Takahashi et al. |
| 5,861,890 | A | 1/1999 | Sakai et al. |
| 5,887,110 | A | 3/1999 | Sakamoto et al. |
| 5,926,208 | A | 7/1999 | Noonen et al. |
| 5,960,150 | A | 9/1999 | Ueda et al. |
| 6,014,706 | A | 1/2000 | Cannon et al. |
| 6,023,553 | A | 2/2000 | Boyce et al. |
| 6,031,574 | A | 2/2000 | Muller |
| 6,049,769 | A | 4/2000 | Holmes et al. |
| 6,360,054 | B1 | 3/2002 | Nakano et al. |
| 7,356,245 | B2 * | 4/2008 | Belknap et al. ............... 386/75 |

FOREIGN PATENT DOCUMENTS

| | | | |
|---|---|---|---|
| EP | 0702493 | A1 | 3/1996 |
| JP | 06-133262 | A | 5/1994 |
| JP | 08-026591 | | 1/1996 |
| JP | 08-026591 | A | 1/1996 |
| JP | 08-098146 | A | 4/1996 |
| JP | 11-134814 | A | 5/1999 |
| JP | 11134814 | | 5/1999 |
| JP | 2000-032396 | | 1/2000 |
| JP | 2000-032396 | A | 1/2000 |
| KR | 1997-707676 | | 9/1995 |
| WO | WO 96/13122 | A1 | 5/1996 |

OTHER PUBLICATIONS http://www.cselt.it/mpeg/; MPEG Homepage.

http://www.jpeg.org/public/jpeghomepage.htm; Official JPEG Homepage.

Andrew S. Tanenbaum, *Computer Networks*, Third Edition, Prentice Hall PTR,Upper Saddle River, NJ 07458, pp. 734-742, ISBN 0-13-349945-6.

Wallapak Tavanapong, Kien A. Hua, James Z. Wang, *A Framework for Supporting Previewing and VCR Operations in a Low Bandwidth Environment*, pp. 303-311. ACM 0-89791-991-2/97/11.S3.50.

U.S. Appl. No. 09/295,076, D. Petkovic, et al., "System and Method for Linking an Audio Stream with Accompanying Test Material", filed Apr. 20, 1999.

Office Action for Application No. 2003-7015664 in Korean language dated Dec. 7, 2005 (receipt date of Dec. 8, 2005).

English translation of the above-referenced Korean Office Action for Application No. 2003-7015664.

* cited by examiner

SYSTEMS AND COMPUTER PROGRAM PRODUCTS TO FACILITATE EFFICIENT TRANSMISSION AND PLAYBACK OF DIGITAL INFORMATION

This is a continuation of application Ser. No. 09/895,055 filed Jun. 29, 2001 in the United States Patent and Trademark Office. The entire disclosure of the prior application, application Ser. No. 09/895,055 is hereby incorporated by reference.

BACKGROUND OF THE INVENTION

1. Field of the Invention

The present invention is directed to the field of video and audio scanning, storage, and playback. It is more particularly directed to digital video and audio operations to facilitate trick mode playback on a computer system.

2. Description of the Background Art

Digital video and audio information is typically transmitted between computer systems in a highly compressed and encoded frame format. Further, the video information may be translated into differentially encoded frames for storage and transmission. The compressed and encoded frames are formatted so that the digital video and audio information may be referenced and played back in an order dependent fashion that is also time sensitive. Typically the information is ordered with respect to a forward directed presentation of the frames. These encoding techniques enable trick mode operations that emulate Video Tape Recorder (VTR) functions, such as fast forward scan and fast reverse scan. However, digital encoding operations have suffered from problems of efficiency and slow responsiveness during playback primarily due to the large amount of variable sized, order dependent, and time sensitive information that is generated during the creation of the encoded frames.

Typically, trick mode files are processed on an initiating computer system or a managing computer system that is often called a "data server" computer system. These trick mode files are created by extracting video frames, re-timing the video frames, and eliminating some of the encoded video frames. The audio information associated with the extracted video frames is typically compressed and identified so that the association between the video and audio information is preserved. These trick mode frames tend to be difficult to properly produce due to their complexity. Further, these complex frames may increase the data storage requirements over the encoded digital video and audio files by as much as seventy-five percent. Also, since the trick mode files are typically located on the data server computer system they suffer from transmission latency problems with respect to the viewing computer system, often called a "client" computer system. The transmission rate associated with trick mode files may be as much as twenty times greater than the transmission rate associated with the digital video and audio information.

Alternately, the trick mode video frames and the associated compressed audio frames may be stored locally, such as on the client computer system. That is, the trick mode video frames and the associated compressed audio frames may be decoded and re-encoded on the client computer system when the video and audio is played back. However, this solution requires extensive computer processing resources and a large data storage capacity on the client computer system. Also this solution suffers from transmission latency since the large files are downloaded on the client computer system.

Yet another solution to the problem of processing complex trick mode frames is to tightly couple the client computer system and the data server computer system. That is, the playback requests from the client computer system may be associated with indexing commands that are managed on the data server computer system. The playback operations on the client computer system rely on proper location of the requested video and audio frames that are stored on the data server computer system. This solution also suffers from transmission latency problems between the data server computer system and the client computer system. Further this solution suffers from problems when scaling to accommodate increased numbers of users due to the extensive requirements for both computer resources and network utilization that are associated with maintaining the tight coupling between the data server computer system and the client computer system.

Differential encoding typically tracks differences between key frames that may be referred to as "anchor" frames. However, random access of frames that may be used for trick mode operations is difficult since multiple anchor frames may be required to provide sufficient information to reference a randomly selected location, and since headers that contain information associated with the encoded frames may vary in size. More particularly, referential information associated with locating a particular frame may be stored in more than one associated frame. Also, the decoding rules that are associated with each frame and that enable accurate decoding of encoded digital video frames vary in size, and the headers that store the information associated with the rules also vary in size. Performing trick mode operations adds further complexity to the process of playing video frames that have been differentially encoded. Therefore differential encoding operations have suffered from efficiency problems and slow responsiveness during playback due to the number of associated frames and the variable sized differentially encoded frames.

Transmission errors that are associated with the anchor frame may affect many digital video frames. Therefore, encoding operations that have suffered from problems associated with management of transmission errors that are related to transmitting a large amount of digital information, are additionally hampered when the information is differentially encoded.

Fast reverse video playback operations are especially difficult. The difficulty is primarily associated with playing information in the reverse direction that was created in a forward order fashion that is also time sensitive. Reverse playback is also difficult due to the variable size of the encoded frames. More particularly, it is difficult to locate a particular frame for the purpose of scanning in a fast reverse direction while maintaining a constant delivery rate of the information. Those skilled in the art will appreciate that video and audio delivery technologies often rely on a constant delivery rate of the information.

From the foregoing it will be apparent that there is still a need to improve transmission of information used to facilitate fast and responsive playback of video and audio digital data.

SUMMARY OF THE INVENTION

An embodiment of the present invention relates to systems, methods, and computer products that facilitate transmission of information used for fast and responsive video and audio playback at non-standard, trick mode speeds. An embodiment of the present invention uses low resolution, compressed, and independent frames derived from the encoded digital video or audio information. The independent frames facilitate the operation of user-requested VTR-like speed change functions associated with digital video and digital audio frames. That is, the low resolution, compressed frames facilitate indexing into the full resolution encoded digital video and audio information. Typically, the encoded digital video and audio information is stored on one computer system and is played on another computer system.

The present invention greatly simplifies locating specific frames in a video or audio presentation for fast forward and fast reverse scanning that is typically used in digital editing. The present invention delivers and manipulates smaller amounts of digital data thereby locating positions in a stream of digital data more quickly than in the past. Also, since the compressed frames are a subset of the entire set of frames, the scanning operation will appear to the user as a fast operation when viewed in either the forward or the backward direction. That is, the use of low resolution, compressed, and independent frames to locate positions in associated digitally encoded video or audio data improves the responsiveness and transmission efficiency of locating digitally encoded data.

The compressed streams are much smaller than the original digital video and therefore may be processed, transmitted, and displayed more efficiently than past solutions. The high level of data reduction is achieved by reducing the image size, the resolution, and the color depth, and may take advantage of data compression operations such as JPEG. The present invention enables fast mode presentation of audio information associated with the compressed video data. A high level of data reduction is also applied to the audio data. This enables fast mode scanning for audio cues.

The present invention is especially useful since the compressed, independent frame data stream is small enough to be downloaded and managed on a user-accessible client computer system that is sometimes referred to as a "thin client." This enables very fast response times to user input and reduces the latency that is associated with transmission between computer systems of the information used in fast speed playback.

The Joint Photographic Experts Group (JPEG) is a group of experts that produce standards for continuous-tone image coding. The JPEG committee created the first of a multi-part set of standards for still image compression. JPEG is defined in International Standard 10918.

More particularly the present invention may be a computer implemented method for digital video and audio scanning that facilitates trick mode playback. The preferred embodiment of the present invention accesses encoded digital video and digital audio frames. The encoded frames may be stored on a data storage media associated with a computer system or may be created by a computer system when they are needed. The digital video frames are typically differentially encoded, by compressing the information and including differential positional information. The associated digital audio frames are typically compressed. A subset of the encoded digital video frames are identified for fast playback, and will be referred to herein as "playback video frames." Similarly, a subset of the encoded digital audio frames are processed and identified for fast playback, and will be referred to herein as "playback audio frames." For each of the identified encoded digital video frames the associated playback video frame is encoded, typically by translating information in an MPEG format into information in an JPEG format. Likewise, for each of the identified encoded digital audio frames the associated playback audio frame is encoded. This encoding may include additional compression or may merely include a location identifier that associates the proper playback video frame with the playback audio frame to ensure synchronized fast speed playback. Visual representations of the audio frames may be presented in addition to the audio information. For example, audio attributes, such as the audio frequency or amplitude change, could be represented on a graph. Those skilled in the art will appreciate representation of audio frequency or amplitude information. By means of example, every third digital frame and audio frame may be included in the subset encoded for fast mode operations. Then the number of compressed frames is one-third of the associated digital frames. Therefore, playing of the playback frames will result in a fast speed presentation of the data that is suitable for trick mode operations.

The Moving Picture Experts Group (MPEG) is a working group of the International Organization for Standardization (ISO) and the International Electrotechnical Commission (IEC) in charge of the development of standards for encoded representation of digital data representing audio and video information.

According to the preferred embodiment of the present invention, the encoded digital video and audio frames are multiplexed by methods known to those skilled in the art. Also, the playback frames may be multiplexed. Then the multiplexed and encoded digital video and audio frames are transmitted, typically by streaming, from the initiating computer system to the receiving computer system where they are de-multiplexed and decoded. The receiving computer system could be a data server computer system or a client computer system. The encoded playback frames that may also be multiplexed are transmitted, typically by downloading to the receiving computer system where they are de-multiplexed if necessary and decoded. Now the receiving computer system may play the digital video frames, the digital audio frames, the playback video frames, and the playback audio frames so that the user can see and hear the digital frames and the playback frames. Synchronization of the digital frames and the playback frames is important. Typically synchronization during playing of the digital frames and the playback frames is enabled by using a time stamp location identifier that is associated with each frame. Synchronization is enabled by identifying the frames with the same time stamp identifier and ensuring that the identified frames are played concurrently. If directed by a user, the present embodiment will change the played frames to preserve synchronization. Therefore, the playback frames that are playing in a fast viewing mode, either forward or backward, enable quick location of digital video frames for customized viewing and editing.

The digital video frame and the digital audio frame may be played on the receiving computer system or on another playback computer system, typically by the use of a digital window. Another viewing window, such as a trick mode, preview window, may be used to play the associated playback video frame and playback audio frame. Alternately, the associated playback frames may be played by overlaying the information on the digital window.

It will be appreciated that the benefits of the present invention may be realized in an alternative embodiment of the present invention without inclusion of either the digital audio information or the digital video information. For example, synchronization and indexing between the digital video data and the playback video data enables more efficient editing of digital video information even without including audio data.

Other aspects and advantages of the present invention will become apparent from the following detailed description,

BRIEF DESCRIPTION OF THE DRAWINGS

In the following detailed description and in the several figures of the drawings, like elements are identified with like reference numerals.

DETAILED DESCRIPTION OF THE INVENTION

Figure 1:
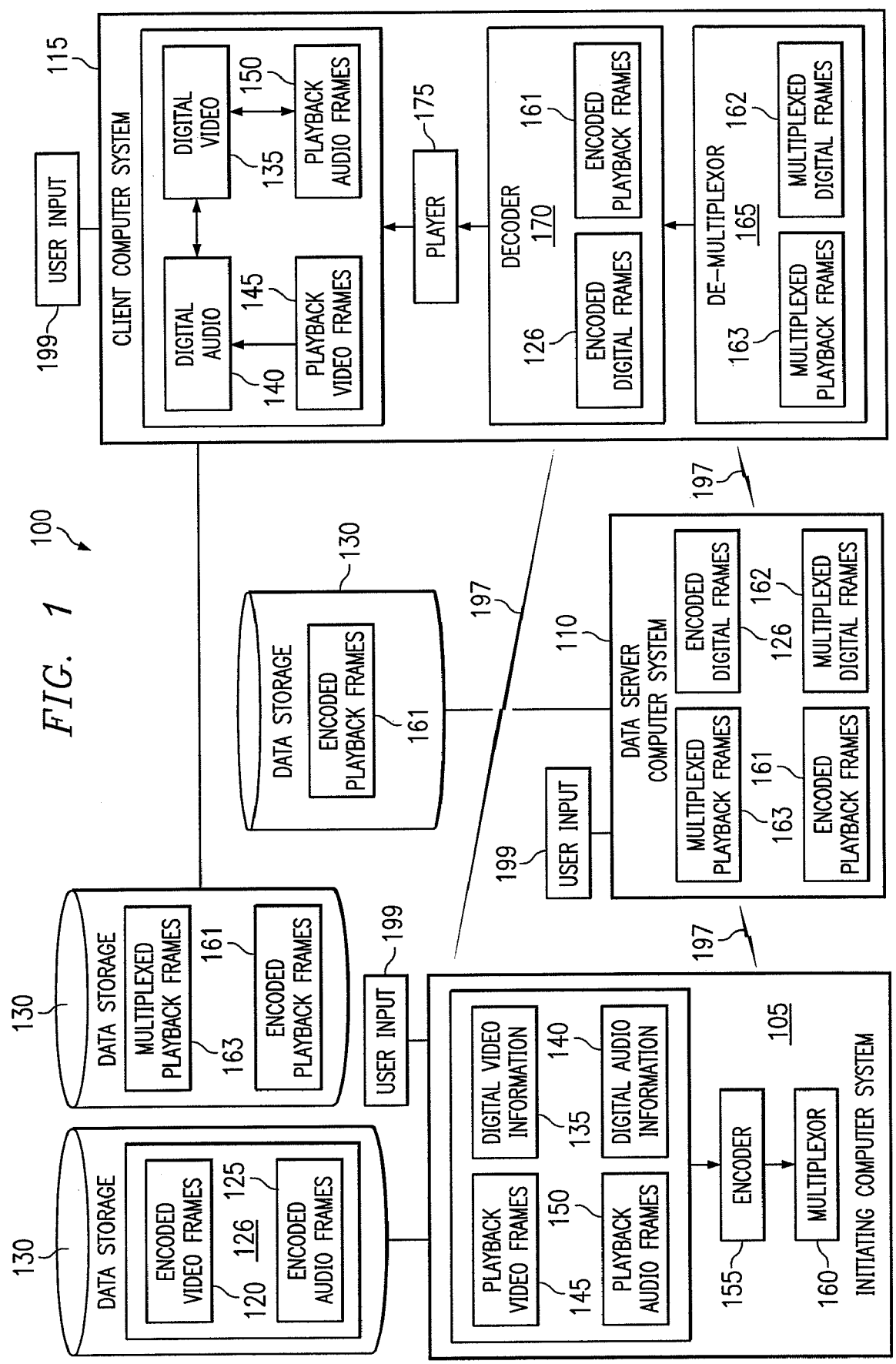
FIG. 1 is a block diagram that illustrates the present invention.

As shown in the drawings and for purposes of illustration, the embodiment of the invention novelly facilitates transmission of information used for fast and responsive video and audio playback at non-standard trick mode speeds. Existing playback systems have not been able to efficiently produce and transmit non-standard trick mode video and audio information.

The present invention decreases digital resolution by converting a subset of the digital frames into a sequence of compressed frames, such as JPEG frames that can be scanned forward or backward. Since the compressed frames are a subset of the entire set of frames, the scanning operation will appear to the user as a fast operation in the forward or the backward direction. The low resolution requires a lower bit rate and therefore a smaller digital file. The low resolution does not limit the user's ability to scan since user scanning does not require high resolution. Therefore by treating each frame as a new compressed frame, each frame can be scanned in either the forward or the backward direction more efficiently than in the past. The phrase, "bit rate" as used herein refers to the rate of transmission of small amounts of computer information. A "bit" is typically the smallest unit of information in a computer system.

Alternative embodiments of the present invention may create varying sized subsets of the digital frames. For example every other frame could be included in a sequence of compressed frames and the resulting subset of compressed frames yields a two-times faster data presentation than the original digital frames. In another alternative, a repeating sequence could be created in which one digital frame is skipped, the next digital frame is translated into a compressed frame, then two digital frames are skipped before the next compressed frame is created. This asymmetric repeating sequence is possible since there are no dependencies between the compressed images with respect to the scanning function. Therefore, almost any scanning rate may be achieved by the present invention. A "frame" is typically digital data that represents an independent, single sample of digital information.

In the preferred embodiment of the present invention as illustrated in FIG. 1 and element 100, the extraction of compressed image information occurs on an initiating computer system 105 and is stored on a data server computer system 110. Then the compressed frame information may be efficiently transmitted when requested to a client computer system 115. In an alternative embodiment the operations may be performed on one computer system or on two computer systems, instead of by use of the initiating computer system 105, the data server computer system 110, and the client computer system 115.

More particularly the present invention may be a computer implemented system, method, or computer program product for digital video and audio scanning that facilitates trick mode playback. The preferred embodiment of the present invention accesses encoded digital video frames 120 and digital audio frames 125, jointly referred to herein as encoded digital frames 126. The encoded digital frames 126 may be stored on a data storage device 130 associated with a computer system or may be created by a computer system when they are needed from the video information 135 and the audio information 140. The encoder 155 typically encodes the digital video frames 120 and the digital audio frames 125, by compressing the information and differential positional information is included with the compressed digital video frames 120. For example the encoder 155 may be an MPEG encoder. A subset of the encoded digital video frames 120 are identified and translated into playback video frames 145. Similarly, a subset of the encoded digital audio frames 125 are identified and translated into playback audio frames 150. The playback video frames 145 and the playback audio frames 150 may be generated from the encoded digital frames 126 or may be created as needed from the digital video information 135 and the digital audio information 140.

Each of the playback video frames 145 is processed by the encoder 155 that produces encoded playback video frames. Also, each of the playback audio frames 150 is processed by the encoder 155 that produces encoded playback audio frames. The encoded playback video frames and encoded playback audio frames are jointly represented herein by the encoded playback frames 161. Those skilled in the art will recognize that any combination of the components, or any number of different components, and other devices, may be used to create the encoder 155. The encoder 155 may be a software module, a hardware component, or a combination of the two. Further, the encoder 155 that generates encoded playback frames 161 may be different from the encoder 155 that generates encoded digital frames 126. In an alternative embodiment of the present invention only digital audio frames 125 or only digital video frames 120 are processed.

Typically the present invention will translate video information in an MPEG format into compressed information in an JPEG format during the encoding stage. There are many compression applications and standards known in the art that typically use encoding techniques. What is seen as a smooth, full motion video or film is actually a sequence of still images flashing by just faster than what the eye can see. The audio encoding may include additional compression or may merely include information to ensure synchronization of the video and audio information during playback. Analog audio information may be sampled and transformed into digital values representing the sound in terms of functions, such as volume, pitch, or timbre. These samples represent digital audio, such as is found in WAV files or Compact Disks. This digital audio information can be of very high quality and accuracy if sufficiently refined samples are used. The digital audio data is compressed by the encoder 155 to enable streaming.

In the preferred embodiment both video and audio information is processed. The encoded digital frames 126 are multiplexed by the multiplexor 160 producing multiplexed digital frames 162. The encoded playback frames 161 are multiplexed by the multiplexor 160 producing multiplexed playback frames 163. The multiplexed digital frames 162 are streamed to the data server computer system 110 and typically directly on to the client computer system 115. Then the client computer system 115 may operate as a software-based player 175 and provide bit manipulation that is required for audio and video rendering. The client computer system 115 may include a de-multiplexor 165 that translates the multiplexed digital frames 162 to individual encoded digital video 120 and encoded digital audio frames 125, jointly referred to as encoded digital frames 126. The decoder 170 then translates the encoded digital frames 126 back into digital video 135 and digital audio frames 140 suitable for playing to the user on the client computer system 115. For example, MPEG decoders receive data, typically from a network interface card or a local disk and then directly write the video and audio bit map to the computer memory for presentation to the user. Those skilled in the art will appreciate that applications may buffer all or a part of the digital video 135 and digital audio 140 clips before playing.

By means of explanation, a simple stream encapsulates audio or video data or the output of data encoding and transmits the data in portions, typically referred to as "packets," directly to the receiving computer system, such as the client computer system 115. A simple stream typically contains a single type of signal, such as digital audio 140 or digital video 135. The process of combining simple streams into a single synchronous transmission bit stream is multiplexing. The multiplexed information may be streamed over data transmission devices 197 that are typically referred to as "links," such as radio frequency links (UHF and VHF), digital broadcast satellite links, and cable TV networks. A transport stream is a particular type of multiplexed stream that combines one or more simple streams and transports the data, typically between computer systems.

Also, the multiplexed playback frames 163, when available, may be streamed directly to a computer system such as the client computer system 115 or may be stored in data storage 130. The multiplexed playback frames 163 may be de-multiplexed by the de-multiplexor 165. Then the encoded playback frames 161 may be translated by the decoder 170 back into the playback video frames 145 and the playback audio frames 150 for presentation to the user. The encoded playback frames 161 typically require less storage space and may be efficiently transmitted and stored on the client computer system 115 or alternately on the data server computer system 110.

More particularly, the multiplexed playback frames 163 may be streamed directly to the client computer system 115 or may be downloaded and stored until needed on a data storage device 130 associated with the data server computer system 110 or the client computer system 115. With the high level of data reduction achieved by reducing the image size, the resolution, and the color depth, and the high level of compression offered by well known techniques such as JPEG, the frames are much smaller than the encoded digital frames 126 and therefore may be processed, transmitted, and displayed more efficiently than past solutions. This small size allows the stream to be downloaded as a file using well-known operations such as HTTP download or File Transfer Protocol (FTP) onto the client computer system 115 thereby allowing very fast user response time in viewing and scanning the compressed frames. Those skilled in the art will appreciate the use of HTTP download or FTP for downloading digital data.

In the preferred embodiment, the encoding process includes time stamp information into the simple stream and the decoder 170 may regenerate accurate time stamps from the encoded information. The video and audio information may be synchronized by use of the time stamp information. For example, the player 175 may provide audio 140 and video 135 digital data that is associated with the playback video frames 145 and the playback audio frames 150 that is synchronized by a time stamp that is associated with each frame. The time stamp may indicate the exact moment when the digital video frame 135 and the digital audio frame 140 were created. The time stamp associated with either the playback video frame 145 or the playback audio frame 150 may reference the time code from which they were derived. Synchronization is achieved by concurrently presenting the frames with the same time stamp to the user, via the player 175. Therefore, when the time stamps of each frame match, the information may be synchronized.

In the preferred embodiment of the present invention the user may direct whether incremental playing of the digital information 126 or the playback video frames 145 and the playback audio frames 150 occurs. The user input 199 may be received from either the initiating computer system 105, the data server computer system 110, or the client computer system 115. The user may pause the playing of the digital frames 126 or the playback video frames 145 and the playback audio frames 150. When switching from playing the playback video frames 145 and the playback audio frames 150 to playing the digital frames 126 the time stamp location identifier is matched with the current playing location of the playback video frames 145 and the playback audio frames 150. For example, as the user changes the position of the currently presented playback video frames 145 the subsequent playing of the associated playback audio frames 150 and the digital frames 126 is matched to ensure synchronization of the playing frames. The time stamp references associated with each frame preserve the time-based ordering associated with the original video and audio information. The reduced size of the stored information may result in an enormous improvement over the computer information storage required to operate fast forward or fast backward operations of the prior art.

In the present embodiment examples of the computer system 500, as described with reference to FIG. 5, include the initiating computer system 105, the data server computer system 110, and the client computer system 115. Those skilled in the art will recognize that any combination of the components, or any number of different components, peripherals, and other devices, may be used with the initiating computer system 105, the data server computer system 110, and the client computer system 115. Those skilled in the art will also recognize that the present invention may be implemented on a single computer system or any number of computer systems that are networked together.

Figure 2:
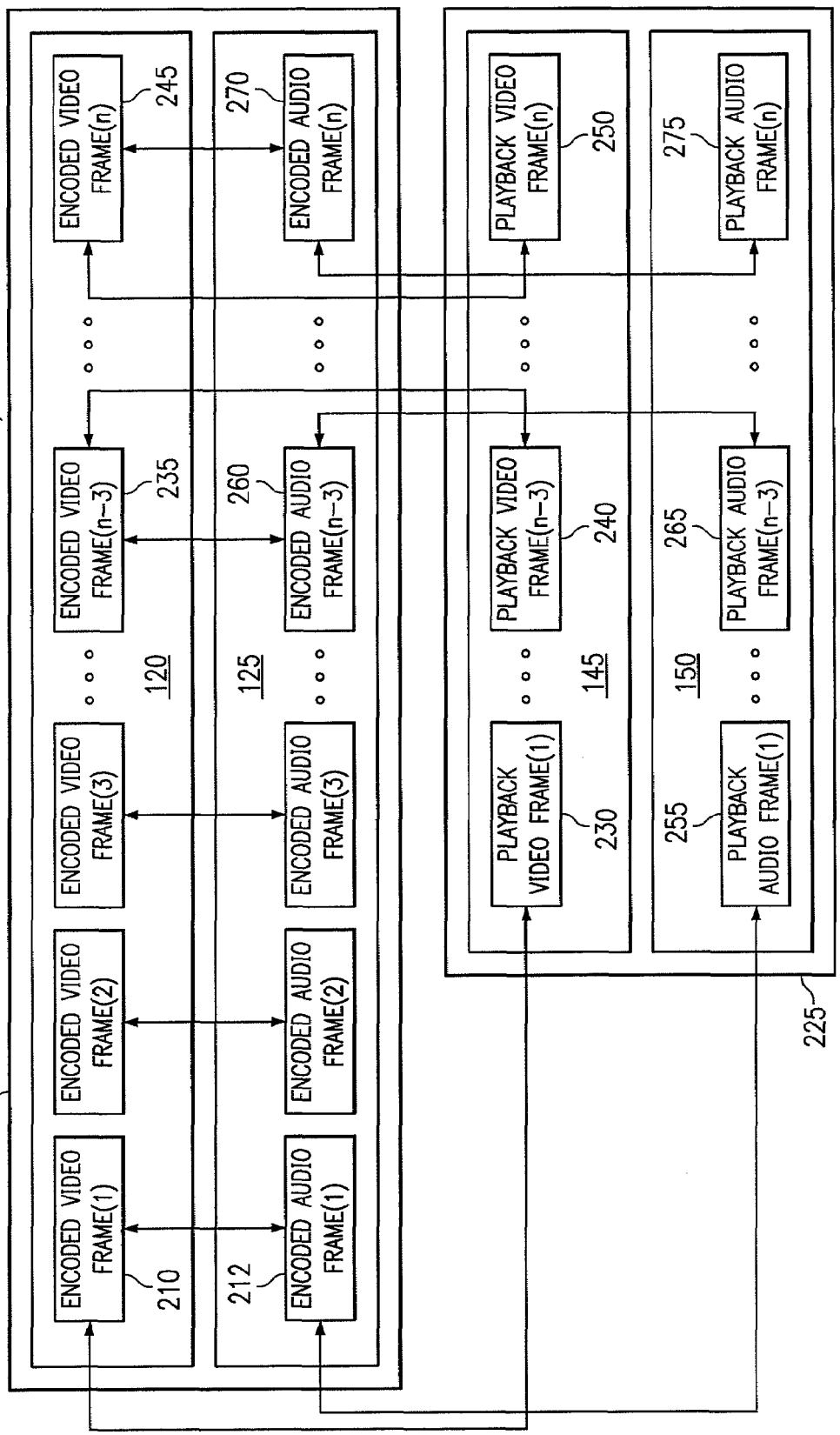
FIG. 2 is a block diagram that illustrates the association between the digital frames and the playback frames.
Figure 3:
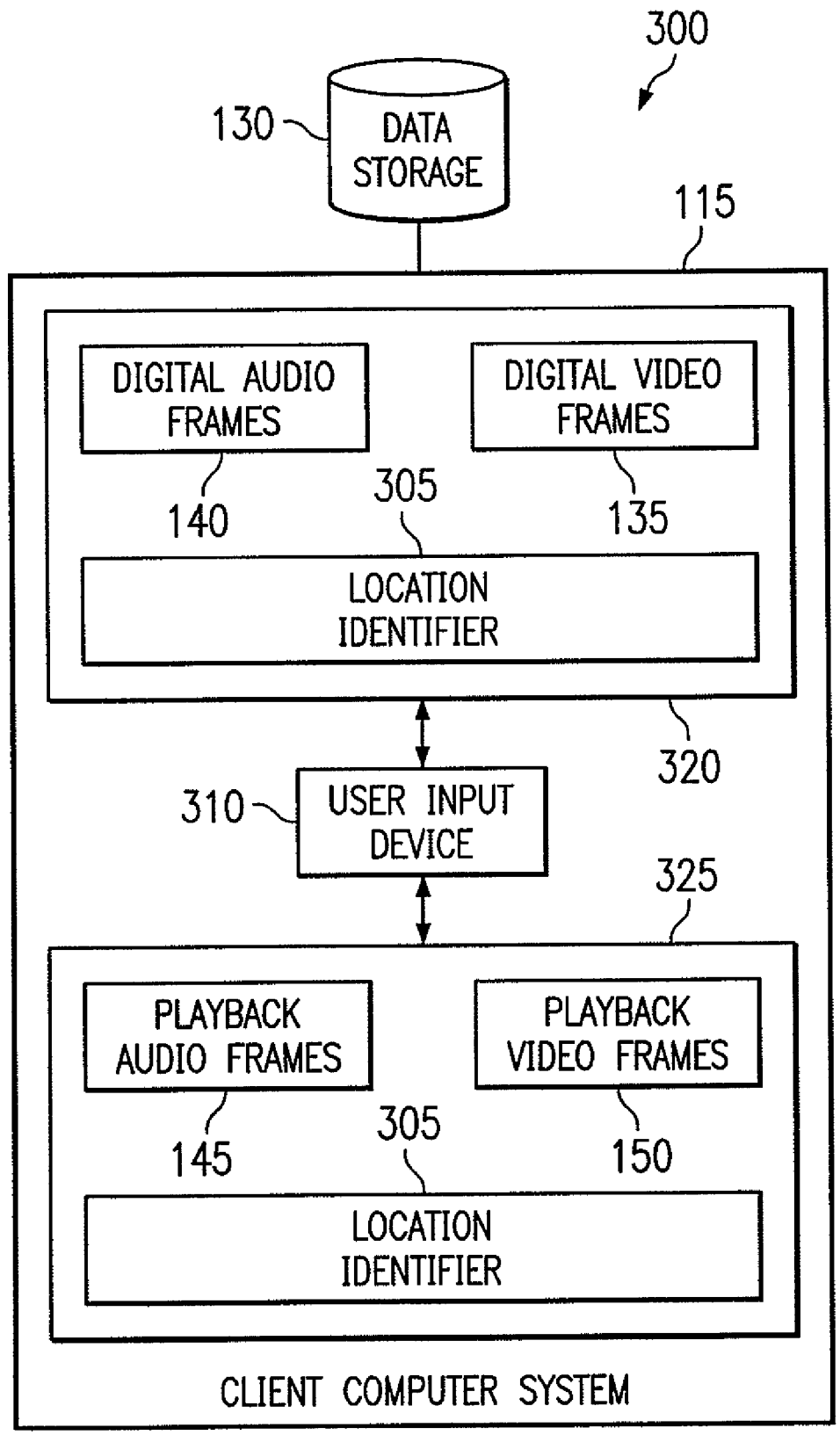
FIG. 3 is a block diagram that illustrates a computer system that plays the digital frames, and the playback frames.

FIG. 2 is a block diagram that illustrates, as shown in element 200, the association between the encoded video frames 120, the encoded audio frames 125, the playback video frames 145, and the playback audio frames 150. The encoded video frames 120 may be associated with the encoded audio frames 125 in order to synchronize the frames. For example, encoded video frame(1) 210 and encoded audio frame(1) 212 may each include a location identifier 305 (as shown in FIG. 3), such as a time stamp. Then encoded video frame(1) 210 and encoded frame audio frame(1) 212 may be synchronized, even after multiplexed transmission, by matching the associated location identifiers 305. Those skilled in the art will recognize that the association between the encoded video frames 120 and the encoded audio frames 125 does not have to be one-to one since the audio information may be represented by audio samples that are a portion of the available audio information. Likewise, the association between the playback video frames 145 and the playback audio frames 150 does not have to be one-to-one.

Low resolution, compressed playback frames are translated from encoded digital frames 126 to form a compressed playback frame stream 225 that represents a subset of the digital information. For example, JPEG images could be captured for every third, fourth, or sixth video frame 120 and stored into the playback frame stream 225. Then as these images are displayed in sequence they appear to be displaying the video information at three-times, four-times, or six-times faster than normal, respectively. Additional speeds could be generated by skipping over frames and only displaying identified frames to achieve a wide range of display speeds, again in either forward or reverse order.

Alternately, low resolution, compressed playback audio frames 150 are translated from the encoded digital audio frames 125. Therefore, the present invention also enables quick location of digital audio frames 125 by the use of audio cues included in the playback audio frames 150 by use of matching location identifiers 305. That is, the digital encoded audio frames 125 can be compressed and sub-sampled to enable indexing by the client computer system 115 (as shown in FIG. 1) of the playback audio frames 150. Therefore, the location identifier 305 associated with the sub-sampled digital encoded audio frames 125 and the playback audio frames 150 may be compared to synchronize the playing location.

By means of example, in an embodiment of the present invention playing the compressed information results in a three-times speed increase over the playing rate of the digital video and audio information. Therefore the playback frame stream 225 includes every third frame in a compressed frame format. Now, the encoded video frame(1) 210 is associated with the playback video frame(1) 230 and every third encoded video frame is then associated with a playback video frame 145. So, encoded video frame(n−3) 235 is associated with playback video frame(n−3) 240, and encoded video frame(n) 245 is associated with encoded video frame(n) 250, if "n" is divisible by three. The procedure is similar for the playback audio frames 150. Therefore the encoded audio frame(1) 212 is associated with the playback audio frame(1) 255 and every third encoded audio frame 125 is then associated with a playback audio frame 150. So, encoded audio frame(n−3) 260 is associated with playback audio frame(n−3) 265, and encoded audio frame(n) 270 is associated with playback audio frame(n) 275, if "n" is divisible by three.

FIG. 3 is a block diagram that in element 300 illustrates the presentation of information to the user. The preferred embodiment presents the information on the client computer system 115. It will be appreciated that the information could be presented on another computer system, such as the initiating computer system 105 or the data server computer system 110. For example, the user could be presented with both the normal digital window 320 and a special preview window 325 that enables trick mode viewing. The preview window 325 enables fast previewing and VTR-like browsing of the playback audio 150 and video frames 145 that are associated with the digital frames that may be streamed to the client computer system 115. Alternately these windows could be overlaid or combined to achieve the appropriate function. This will allow the user to quickly locate a position in the playback video frames 145 and the playback audio frames 150 and then access the associated position in the digital audio frames 140 and the digital video frames 135 that are presented in full resolution mode. The encoded playback frames 161 are typically stored on the data storage device 130 and may be decoded for presentation via the preview window 325. Elements 105, 110, and 161 are also described with reference to FIG. 1.

The user can indicate that the presentation of either the digital window 320 or the preview window 325 should be changed. The new location can be identified by the user via movement throughout the frames that are played via the preview window 325. The location identifier 305 that facilitates synchronizing the playing location of the digital audio frames 140, the digital video frames 135, the playback video frames 145, and the playback audio frames 150 could be a time stamp or other location identification information. In the present embodiment, the user input device 310 is used to indicate that the preview window 325 or the digital window 320 should be changed and to indicate that a new location for the presentation is desired. The user may indicate in the preview frame 325 that the location playing should be changed. The user input device functions may be accomplished by any method known in the art such as a slider switch, a knob, a joy-stick, or any other technique whether known now or developed in the future.

Figure 4:
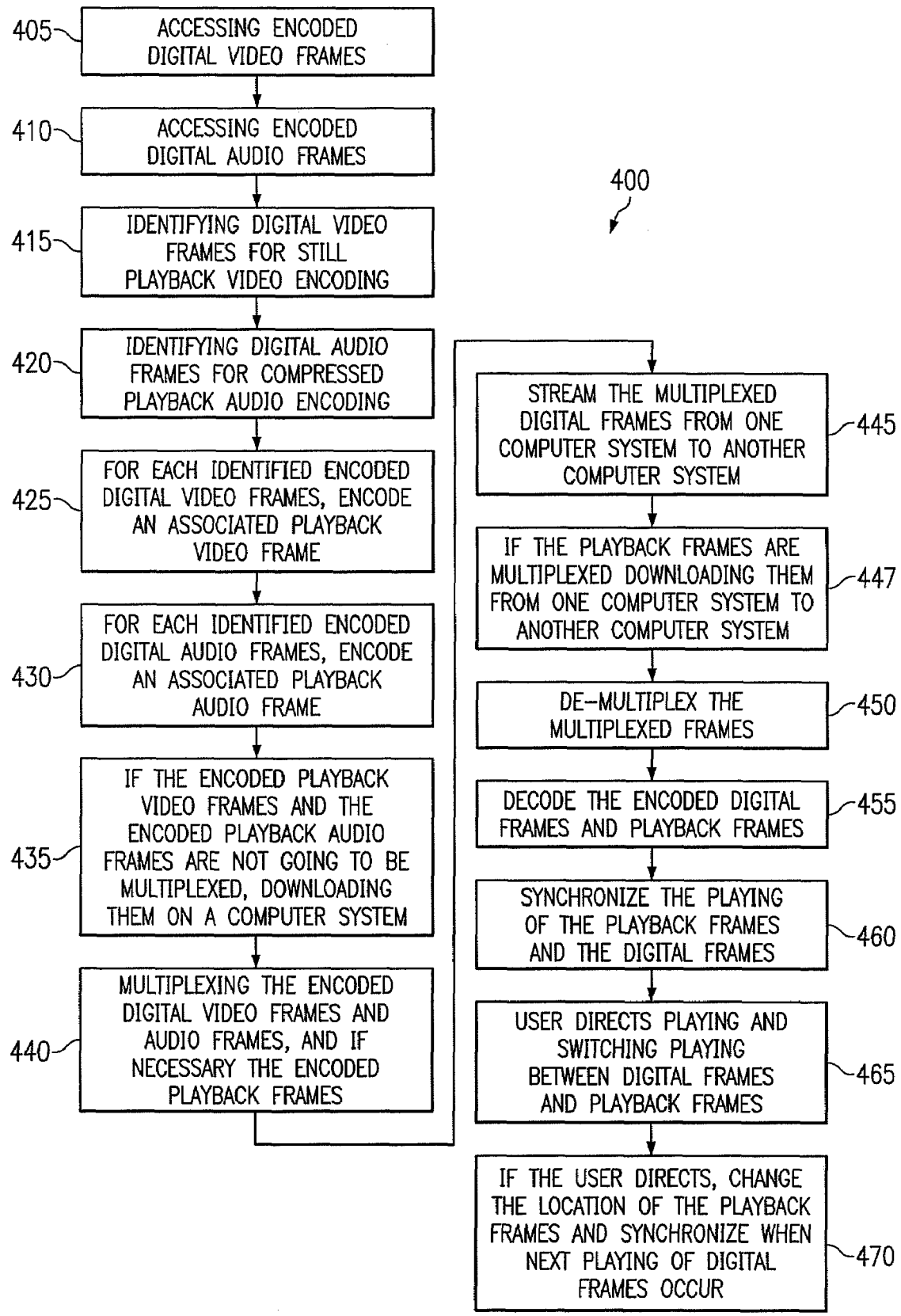
FIG. 4 is a flow diagram that illustrates the present invention.

FIG. 4 is a flow diagram that illustrates the present invention. The preferred embodiment of the present invention as shown in element 400, accesses encoded digital video frames 120, as shown in element 405, and digital audio frames 125 as shown in element 410. The digital video frames 135 are typically differentially encoded, by compressing the information and including differential positional information. The digital audio frames 140 are typically compressed. A subset of the encoded digital video frames 120 are identified for compressed video playback encoding, as shown in element 415. Similarly, a subset of the encoded digital audio frames 125 are processed and identified for compressed audio playback encoding, as shown in element 420. For each of the identified encoded digital video frames 120 the associated compressed playback video frame 145 is encoded, as shown in element 425. Likewise, for each of the identified encoded digital audio frames 125 the associated compressed playback audio frame 150 is encoded, as shown in element 430. By means of example, an evenly spaced subset of the digital frames may be identified as appropriate for compressed encoding. Then the amount of compressed frame data is smaller than the associated digital frame data. Therefore, playing of the playback video frames 145 and the playback audio frames 150 will result in a fast-speed presentation of the data that is suitable for trick mode operations. Elements 120, 125, 135, 140, 145, and 150 are described with reference to FIG. 1.

According to an embodiment of the present invention as shown in element 435, when the encoded playback video 145 and playback audio frames 150 are not multiplexed, they are downloaded from the initiating computer system 105 to the data server computer system 110. Then, the encoded digital video frames 120, digital audio frames 125, and encoded playback frames 161 are multiplexed by methods known to those skilled in the art, as shown in element 440. It will be appreciated that multiplexing the encoded playback frames 161 is optional. Then, the multiplexed digital frames 162 are transmitted by streaming from the initiating computer system 105 to the client computer system 115, as shown in element 445. Also, if the playback frames 163 have been multiplexed they are downloaded to the data server computer system 110 or the client computer system 115, as shown in element 447. Then, if there are multiplexed playback frames 163 they, along with the multiplexed digital frames 162, are de-multiplexed as shown in element 450. The encoded digital frames 126 and the encoded playback frames 161 are also decoded, as shown in element 455. Now the client computer system 115 may process the digital video frames 135, the digital audio frames 140, the playback video frames 145, and the playback audio frames 150, typically by incrementally playing the information so that the user can see and hear the digital and audio information. Elements 105, 110, 115, 126, 161, 162, and 163 are described with reference to FIG. 1.

Synchronization of the digital frames and the compressed frames is important and as shown in element 460, the present embodiment synchronizes the playing of the playback video frames 145, the playback audio frames 150, the digital video frames 135, and the digital audio frames 140. Typically synchronization of the playing of the frames is enabled by using a time stamp identifier. The time stamp identifier is associated with each frame. Synchronization is enabled by identifying the frames with the same time stamp identifier and ensuring that the playing of each frame is timed to occur at the proper time as referenced on the time stamp identifier.

If directed by a user, the present embodiment will incrementally play the digital video frames 135 and the digital audio frames 140. Alternately the user may direct the playing of the playback video frames 145 and the playback audio frames 150. The user may switch between each alternative. This user direction is shown in element 465.

The user may change the location of playing the playback video frames 145 and playback audio frames 150. When a location change has occurred and the playing is switched to playing the digital video frames 135 and the digital audio frames 150 the present invention ensures that the location now matches the most recent playing location of the playback video frames 145 and the playback audio frames 150. This is shown in element 470. This enables quick location of playback video frames 145 and playback audio frames 150 for customized scanning.

Figure 5:
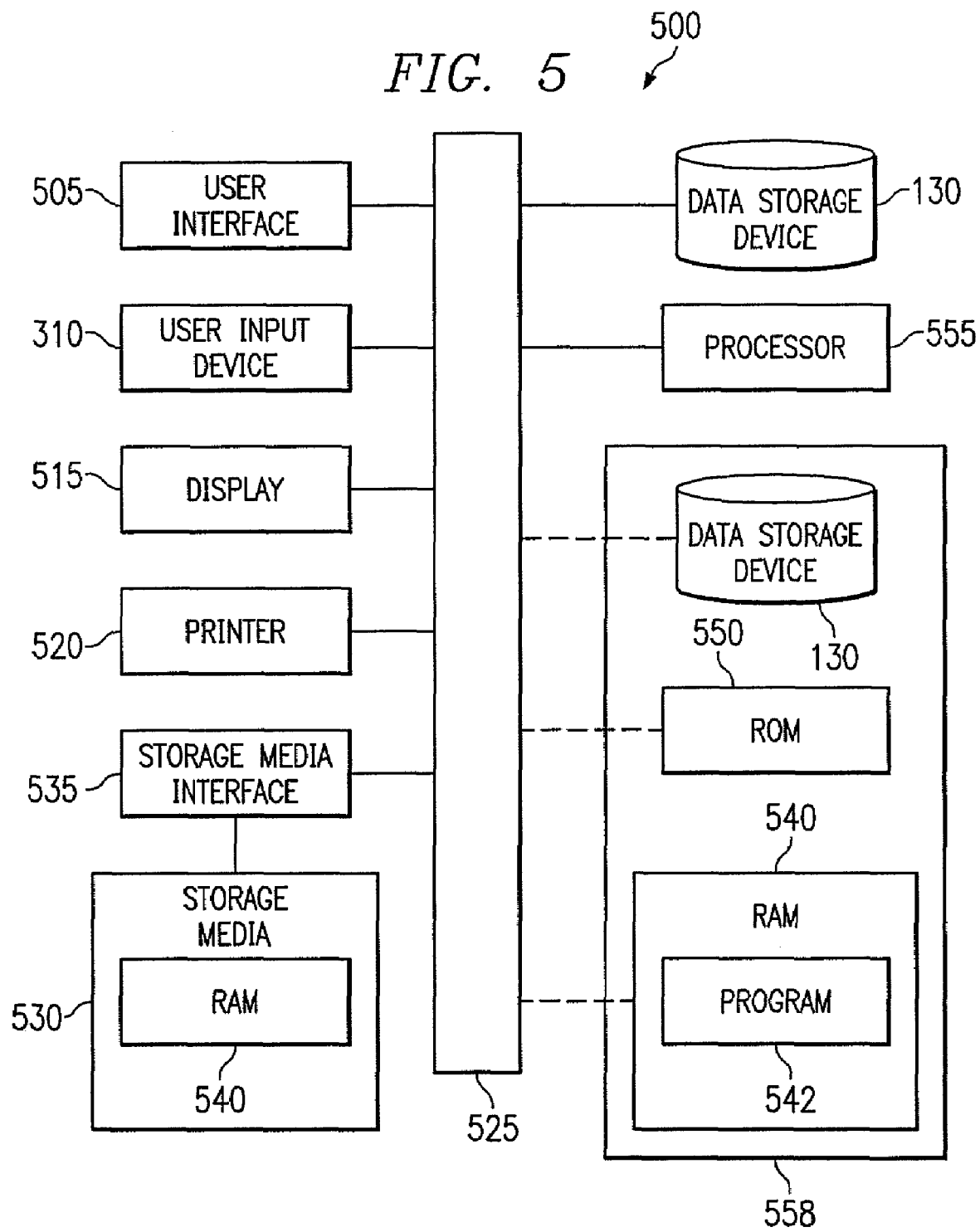
FIG. 5 is a block diagram of a computer system suitably configured for employment of the present invention.

FIG. 5 is a block diagram of a computer system 500, suitable for employment of the present invention. System 500 may be implemented on a general-purpose microcomputer, such as one of the members of the IBM Personal Computer family, or other conventional work-station or graphics computer device. In its preferred embodiment, system 500 includes a user interface 505, a user input device 310, a display 515, a printer 520, a processor 555, a read only memory (ROM) 550, a data storage device 130, such as a hard drive, a random access memory (RAM) 540, and a storage media interface 535, all of which are coupled to a bus 525 or other communication means for communicating information. Although system 500 is represented herein as a standalone system, it is not limited to such, but instead can be part of a networked system. For example, the computer system 500 may be connected locally or remotely to fixed or removable data storage devices 130 and data transmission devices 197. For example, the initiating computer system 105, the data server computer system 110, and the client computer system 115 also could be connected to other computer systems via the data transmission devices 197. Elements 105, 110, 115, 130, and 197 are described with reference to FIG. 1.

The RAM 540, the data storage device 130 and the ROM 550, are memory components 558 that store data and instructions for controlling the operation of processor 555, which may be configured as a single processor or as a plurality of processors. The processor 555 executes a program 542 to perform the methods of the present invention, as described herein.

While the program 542 is indicated as loaded into the RAM 540, it may be configured on a storage media 530 for subsequent loading into the data storage device 130, the ROM 550, or the RAM 540 via an appropriate storage media interface 535. Storage media 530 can be any conventional storage media such as a magnetic tape, an optical storage media, a compact disk, or a floppy disk. Alternatively, storage media 530 can be a random access memory 540, or other type of electronic storage, located on a remote storage system.

Generally, the computer programs and operating systems are all tangibly embodied in a computer-readable device or media, such as the memory 558, the data storage device 130, or the data transmission devices 197, thereby making an article of manufacture, such as a computer program product, according to the invention. As such, the terms "computer program product" as used herein are intended to encompass a computer program accessible from any computer readable device or media.

Moreover, the computer programs 542 and operating systems are comprised of instructions which, when read and executed by the initiating computer system 105, the data server computer system 110, and the client computer system 115, cause the initiating computer system 105, the data server computer system 110, and the client computer system 115 to perform the steps necessary to implement and use the present invention. Under control of the operating system, the computer programs 542 may be loaded from the memory 558, the data storage device 130, or the data transmission devices 197 into the memories 558 of the initiating computer system 105, the data server computer system 110, and the client computer system 115 for use during actual operations. Those skilled in the art will recognize many modifications may be made to this configuration without departing from the scope of the present invention.

User interface 505 is an input device, such as a keyboard or speech recognition subsystem, for enabling a user to communicate information and command selections to the processor 555. The user can observe information generated by the system 500 via the display 515 or the printer 520. The user input device 310 is a device such as a mouse, track-ball, or joy stick, that allows the user to manipulate a cursor on the display 515 for communicating additional information and command selections to the processor 555.

When operating in accordance with one embodiment of the present invention, system 500 selects a function for use in producing low resolution, compressed frames from encoded digital video 120 or audio information 125 (as shown in FIG. 1). The processor 555 and the program 542 collectively operate as a module for fast and efficient playback of video and audio information at non-standard, trick mode speeds. It will be appreciated that the present invention offers many advantages over prior art techniques.

The present invention is typically implemented using one or more computer programs, each of which executes under the control of an operating system and causes the initiating computer system 105, the data server computer system 110, and the client computer system 115 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims Trademarks IBM is a trademark or registered trademark of International Business machines, Corporation in the United States and other countries.

MPEG is a trademark or registered trademark of Philips Electronics N.V.

We claim:

1. An article of manufacture comprising a non-transitory computer readable storage medium and embodying one or more instructions executable by a computer for causing a computer system to implement a method to facilitate trick mode playback for a user, the method comprising:
   accessing a plurality of encoded digital video frames and a plurality of encoded digital audio frames on a first computer system;
   identifying a subset of said encoded digital video frames for compressed video encoding;
   identifying a subset of said encoded digital audio frames for compressed video encoding;
   for all said identified encoded digital video frames, encoding an associated playback video frame;
   for all said identified encoded digital audio frames, encoding an associated playback audio frame;
   downloading said encoded playback video frames and said encoded payback audio frames on a second computer system;
   streaming said encoded digital video frames and said encoded digital audio frames to said second computer system thereby minimizing resources of said second computer system;
   decoding said encoded digital video frames and said encoded playback video frames;
   decoding said encoded digital audio frames and said encoded playback audio frames;
   if said user directs, incrementally playing said decoded digital video frames or said decoded playback video frames;
   if said user directs, incrementally playing said decoded digital audio frames or said decoded playback audio frames;
   enabling said user to switch between playing said decoded digital video frames and said decoded playback video frames;
   enabling said user to switch between playing said decoded digital audio frames and said decoded playback audio frames;
   enabling said user to change location of playing said decoded playback video frames;
   enabling said user to change location of playing said decoded playback audio frames;
   when switching from playing said decoded playback video frames to playing said decoded digital video frames, matching playing of said decoded digital video frames with said location of playing said decoded playback video frames; and
   when switching from playing said decoded playback audio frames to playing said decoded digital audio frames, matching playing of said decoded digital audio frames with said location of playing said decoded playback audio frames.

2. The article of manufacture of claim 1 further comprising said second computer system including a data server computer system and a client computer system.

3. The article of manufacture of claim 1 further comprising said first computer system including an initiating computer system and a data server computer system.

4. An article of manufacture comprising a non-transitory storage medium readable by a computer and embodying one or more instructions executable by said computer for causing a computer system to implement a method to facilitate fast audio playback for a user, the method comprising:
   accessing a plurality of encoded digital audio frames on a first computer system;
   identifying a subset of said encoded digital audio frames for compressed audio encoding;
   for all said identified encoded digital audio frames, encoding an associated playback audio frame;
   downloading said encoded playback audio frames on a second computer system;
   streaming said encoded digital audio frames to said second computer system thereby minimizing resources of said second computer system;
   decoding said encoded digital audio frames and said encoded playback audio frames;
   if said user directs, incrementally playing said decoded digital audio frames or said decoded playback audio frames;
   enabling said user to switch between playing said decoded digital audio frames and said decoded playback audio frames;
   enabling said user to change location of playing said decoded playback audio frames; and
   when switching from playing said decoded playback audio frames to playing said decoded digital audio frames, matching playing of said decoded digital audio frames with said location of playing of said decoded playback audio frames.

5. The article of manufacture of claim 4 further comprising said second computer system including a data server computer system and a client computer system.

6. The article of manufacture of claim 4 further comprising said first computer system including an initiating computer system and a data server computer system.

7. A computer system for facilitating trick mode playback for a user, comprising:
   a first computer system for accessing:
   a plurality of encoded digital video frames;
   a plurality of encoded digital audio frames;
   a subset of said encoded digital video frames that are identified for compressed video encoding;
   a subset of said encoded digital audio frames that are identified for compressed audio encoding;
   for all said identified encoded digital video frames, an associated encoded playback video frame; and
   for all said identified encoded digital audio frames, an associated encoded playback audio frame;
   a second computer system for accessing:
   said encoded playback video frames that are downloaded thereto;
   said encoded playback audio frames that are downloaded thereto;
   said encoded digital video frames and said encoded digital audio frames that are streamed thereto thereby minimizing resources of said second computer system;
   decoded digital video frames that are decoded from said encoded digital video frames;
   decoded digital audio frames that are decoded from said encoded digital audio frames;
   decoded playback video frames that are decoded from said encoded playback video frames;

decoded playback audio frames that are decoded from said encoded playback audio frames;
wherein said user directs:
said decoded digital video frames being incrementally played on said second computer system; or
said decoded playback video frames being incrementally played on said second computer system;
while said user directs:
said decoded digital audio frames being incrementally played on said second computer system; or
said decoded playback audio frames being incrementally played on said second computer system;
a location of playing said decoded playback video frames being changed by said user; and
a location of playing said decoded playback audio frames being changed by said user; and
said location of playing facilitating synchronized playing of said decoded digital video frames when said user directs playing said decoded digital video frames after playing said decoded playback video frames; and
said location of playing facilitating synchronized playing of said decoded digital audio frames when said user directs playing said decoded digital audio frames after playing said decoded playback audio frames.

8. The computer system of claim 7 further comprising said second computer system including a data server computer system and a client computer system.

9. The computer system of claim 7 further comprising said first computer system including an initiating computer system and a data server computer system.

10. A computer system for facilitating fast audio playback for a user, comprising:
a first computer system for accessing:
a plurality of encoded digital audio frames;
a subset of said encoded digital audio frames that are identified for compressed audio encoding;
for all said identified encoded digital audio frames, an associated encoded playback audio frame; and
said encoded playback audio frames that are downloaded on a second said computer system;
a second computer system for accessing:
said encoded digital audio frames that are streamed thereto thereby minimizing resources of said second computer system;
decoded digital audio frames that are decoded from said encoded digital audio frames; and
decoded playback audio frames that are decoded from said encoded playback audio frames;
wherein said user directs:
said decoded digital audio frames being incrementally played on said second computer system; or
said decoded playback audio frames being incrementally played on said second computer system;
a location of playing said decoded playback audio frames being changed by said user; and
said location of playing facilitating synchronized playing of said decoded digital audio frames when said user directs playing said decoded digital audio frames after playing said decoded playback audio frames.

11. The computer system of claim 10 further comprising said second computer system including a data server computer system and a client computer system.

12. The computer system of claim 10 further comprising said first computer system including an initiating computer system and a data server computer system.

* * * * *